(12) United States Patent
Stober et al.

(10) Patent No.: US 11,173,779 B2
(45) Date of Patent: Nov. 16, 2021

(54) DRIVE UNIT FOR A POWERTRAIN OF AN ELECTRICALLY DRIVEABLE MOTOR VEHICLE, AND DRIVE ASSEMBLY

(71) Applicant: Schaeffler Technologies AG & Co. KG, Herzogenaurach (DE)

(72) Inventors: Benjamin Stober, Forstfeld (FR); Lionel Huber, Drusenheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/972,734

(22) PCT Filed: May 29, 2019

(86) PCT No.: PCT/DE2019/100475
§ 371 (c)(1),
(2) Date: Dec. 7, 2020

(87) PCT Pub. No.: WO2019/238160
PCT Pub. Date: Dec. 19, 2019

(65) Prior Publication Data
US 2021/0260983 A1    Aug. 26, 2021

(30) Foreign Application Priority Data

Jun. 15, 2018  (DE) .......................... 102018114382.6

(51) Int. Cl.
*B60K 6/40* (2007.10)
*B60K 17/24* (2006.01)
(Continued)

(52) U.S. Cl.
CPC ................ *B60K 6/40* (2013.01); *B60K 6/387* (2013.01); *B60K 6/442* (2013.01); *B60K 17/24* (2013.01);
(Continued)

(58) Field of Classification Search
CPC .......... B60K 6/40; B60K 17/24; B60K 6/387; B60K 6/442; F16H 57/043; F16H 57/0476; F16H 57/0037
See application file for complete search history.

(56) References Cited

U.S. PATENT DOCUMENTS

| 2003/0127262 A1* | 7/2003 | Noreikat ................ B60K 6/383 180/65.23 |
| 2005/0206251 A1 | 9/2005 | Foster |
| 2015/0080162 A1* | 3/2015 | Motoyama ............. B60K 6/387 475/5 |

FOREIGN PATENT DOCUMENTS

| DE | 112006001432 B4 | 5/2013 |
| DE | 102015222690 A1 | 5/2017 |

(Continued)

OTHER PUBLICATIONS

Volkswagen AG, "Twin Drive-Ein Schritt in Richtung Elektromobilitat," VDI-FVT-Jahrbuch 2009, Germany.
(Continued)

*Primary Examiner* — David J Hlavka
(74) *Attorney, Agent, or Firm* — LeKeisha M. Suggs

(57) ABSTRACT

A drive unit for a powertrain of an electrically driveable motor vehicle is disclosed having a first electrical machine and a second electrical machine and an output shaft, wherein a rotor of the second electrical machine is connected to the output shaft for conjoint rotation. The drive unit also has a disconnect clutch, by which a rotor of the first electrical machine for torque transmission is connectable to the output shaft, wherein the rotor of one of the electrical machines is at least indirectly supported radially on the rotor of the other electrical machine by at least one bearing.

13 Claims, 2 Drawing Sheets

(51) Int. Cl.
   *B60K 6/387* (2007.10)
   *B60K 6/442* (2007.10)
   *F16H 57/00* (2012.01)
   *F16H 57/04* (2010.01)

(52) U.S. Cl.
   CPC ....... *B60Y 2306/05* (2013.01); *F16H 57/0037* (2013.01); *F16H 57/043* (2013.01); *F16H 57/0476* (2013.01)

(56) References Cited

FOREIGN PATENT DOCUMENTS

| | | |
|---|---|---|
| DE | 102015222691 A1 | 5/2017 |
| DE | 102015222692 A1 | 5/2017 |
| DE | 102015222694 A1 | 5/2017 |
| DE | 102017127695 A1 | 5/2019 |
| DE | 102018103245 A1 | 5/2019 |
| DE | 102018103336 A1 | 8/2019 |
| WO | 2010095610 A1 | 8/2010 |
| WO | 2017084887 A1 | 5/2017 |
| WO | 2017084888 A1 | 5/2017 |
| WO | 2017084889 A1 | 5/2017 |

OTHER PUBLICATIONS

Schaeffler Technologies AG& Co. KG, DE102017128289.0, [Unpublished patent application], Germany.

* cited by examiner

DRIVE UNIT FOR A POWERTRAIN OF AN ELECTRICALLY DRIVEABLE MOTOR VEHICLE, AND DRIVE ASSEMBLY

CROSS-REFERENCE TO RELATED APPLICATIONS

This application is the U.S. National Phase of PCT Appln. No. PCT/DE2019/100475 filed May 29, 2019, which claims priority to DE 102018114382.6 filed Jun. 15, 2018, the entire disclosures of which are incorporated by reference herein.

TECHNICAL FIELD

The disclosure relates to a drive unit for a powertrain of an electrically driveable motor vehicle, in particular of a hybrid motor vehicle, as well as to a drive assembly.

BACKGROUND

Drive devices for a hybrid vehicle are known from the prior art, which include, inter alia, an internal combustion engine, a first electrical machine and a second electrical machine.

DE 10 2015 222 690 A1, DE 10 2015 222 691 A1 and WO 2017 084 887 A1 describe methods for controlling such a drive device, wherein the drive device can be operated in several operating modes.

In DE 10 2015 222 690 A1, a serial hybrid operation is mainly explained, in which the traction drive torque is brought about by means of the second electrical machine and the internal combustion engine drives the first electrical machine to generate electrical energy. It describes how the internal combustion engine is operated at an operating point based on a combined efficiency that depends on the efficiency of the internal combustion engine and on the efficiency of the first electrical machine.

The documents DE 10 2015 222 691 A1 and WO 2017 084 887 A1 describe a performance-oriented and a consumption-oriented mode, whereby each mode is dependent on a condition. This condition indicates that a target drive value is increased to an intermediate value between an internal combustion engine threshold, which represents a maximum drive value in a parallel hybrid mode, in which only the internal combustion engine causes a traction drive torque, and a parallel hybrid mode threshold, which represents a maximum drive value represented in the parallel boost hybrid operation.

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electrical machine coupled to the internal combustion engine, a second electrical machine, an electric accumulator and a main clutch between the internal combustion engine and the drive wheel.

DE 10 2015 222 692 A1 and WO 2017 084 888 A1 describe that the drive device is operated in one of three operating modes. A purely electric operation, a serial hybrid operation or a parallel hybrid operation, wherein the traction drive torque provided during the change from the first operating mode to the second operating mode corresponds to a suitably selectable curve between the traction drive torque provided before and after the change.

DE 10 2015 222 694 A1 and WO 2017 084 889 A1 disclose that a transmission is also enclosed between the internal combustion engine and the drive wheel. Here, the method includes:
  operating the internal combustion engine at a first speed for the first gear in a parallel hybrid mode while a first gear of the transmission is engaged;
  switching to a serial hybrid operation;
  opening the main clutch;
  setting a speed of the internal combustion engine with the main clutch disengaged to a second speed for a second gear of the transmission in the parallel hybrid mode;
  engaging the second gear of the transmission;
  closing the main clutch; and
  switching to the parallel hybrid mode while the second gear is engaged.

From DE 10 2017 128 289.0 (not yet published), a drive unit for a powertrain of a hybrid motor vehicle is known, with an internal combustion engine, a first electrical machine, a second electrical machine, a first transmission stage, and a drive shaft of the first electrical machine and/or the second electrical machine. Furthermore, the drive unit comprises a transmission sub-unit, via which the drive shaft of the respective electrical machine is coupleable or coupled to wheel drive shafts. A second transmission stage is coupled to a countershaft unit, wherein the countershaft unit has an integrated clutch and is further connected to the wheel drive shafts such that the internal combustion engine can be coupled to the wheel drive shafts via the second transmission stage depending on the position of this clutch.

DE 10 2017 127 695.5 (also not yet published) discloses a powertrain for a hybrid vehicle which has a transmission input shaft which is in an operative relationship via a first partial powertrain with a first electrical machine and an internal combustion engine for torque transmission and which is in an operative relationship via a second partial powertrain with a second electrical machine for torque transmission. The second electrical machine is permanently connected to the transmission input shaft so as to transmit torque, and the first electrical machine and the internal combustion engine can be connected to the transmission input shaft in a coupleable manner for torque transmission. The first electrical machine and/or the second electrical machine can be designed to be cooled. It is advantageous when the cooling system is designed using water cooling from a vehicle cooling circuit or oil cooling with transmission oil from the transmission. Furthermore, the disconnect clutch used can also be designed as an oil-cooled multi-plate clutch.

Furthermore, a respective named document describes a hybrid vehicle that can execute a respective method, wherein the structure of the hybrid vehicle is essentially the same for all mentioned documents.

The hybrid vehicle described repeatedly in the prior art comprises an internal combustion engine, a first and a second electrical machine, at least one drive wheel, a main clutch, and a first and a second clutch. The main clutch is enclosed between the internal combustion engine and a drive wheel, the first clutch is enclosed between the first electrical machine and an output shaft of the internal combustion engine, and the second clutch is provided between the second electrical machine and a drive wheel.

It is also known that electrical machines are arranged coaxially in a housing. An electrical machine or its rotor is rotatably mounted on both sides, with at least one mounting of a respective electrical machine, such mounting preferably being implemented in a wall of the housing.

An assembly of two electrical machines known from the prior art is shown in FIG. 1. FIG. 1 shows a schematic representation of a drive unit.

FIG. 1 shows a first electrical machine 110 and a second electrical machine 120, the rotors 111, 121 of which are arranged essentially coaxially to one another, and a disconnect clutch 150, which is arranged in the axial direction between the two electrical machines 110, 120.

The first electrical machine 110 comprises a first stator 112 and a first rotor 111 mounted on a rotor support 10 of the first electrical machine 110, wherein the rotor support 10 here is a first shaft 130. A housing element in the form of a housing wall 41, 40a is provided on both sides of the first electrical machine 110 in the axial direction, namely an outer housing wall 41 on the side of the first electrical machine 110 facing away from the disconnect clutch 150 and an inner housing wall 40a on the side of the first electrical machine 110 facing the disconnect clutch 150. The first shaft 130 is supported by a first rotary bearing 1 of the first electrical machine 110 on the outer housing wall 41 and by a second rotary bearing 2 of the first electrical machine 110 on the inner housing wall 40a, wherein these rotary bearings 1, 2 are arranged on the radial outer side 30 of the first shaft 130.

The second electrical machine 120 comprises a second stator 122 and a second rotor 121 mounted on a rotor support 11 of the second electrical machine 120, wherein the rotor support 11 here is an output shaft 140. The space in which the second electrical machine 120 is arranged is limited in the axial direction on both sides by a housing wall 40b, 42, namely by an outer housing wall 42 on the side of the second electrical machine 120 facing away from the disconnect clutch 150 and by an inner housing wall 40b on the side of the second electrical machine 120 facing the disconnect clutch 150. The output shaft 140 is supported via a first rotary bearing 3 of the second electrical machine 120 on the inner housing wall 40b and via a second rotary bearing 4 of the second electrical machine 120 on the outer housing wall 42, wherein these rotary bearings 3, 4 are arranged on the radial outer side 32 of the output shaft 140.

The output shaft 140 is designed as a hollow shaft, wherein the first shaft 130 is arranged at least in sections radially inside the output shaft 140. Furthermore, a rotary bearing 5 for supporting the output shaft 140 is arranged between the radial inner side 31 of the output shaft 140 and the radial outer side 30 of the first shaft 130, thus radially between the output shaft 140 and the first shaft 130.

The disconnect clutch 150 is arranged in the torque transmission path between the first shaft 130 and the output shaft 140, wherein an input element 20 of the disconnect clutch 150 is connected for conjoint rotation to the first shaft 130 and an output element 21 of the disconnect clutch 150 is connected for conjoint rotation to the output shaft 140, which allows a torque to be transmitted from the first shaft 130 to the output shaft 140 when the disconnect clutch 150 is closed, and vice versa.

It is known to design the so-called first shaft in several parts. The first shaft can comprise, e.g., a hub and an input shaft, wherein the hub is arranged on the radial outer side of the input shaft and the rotor of an electrical machine is arranged on the radial outer side of the hub.

The presented prior art makes it clear that a conventional design of a drive unit is associated with a relatively large axial installation space requirement as well as a high complexity of the housing and correspondingly high manufacturing and assembly costs.

SUMMARY

On this basis, the object of the present disclosure is to provide a drive unit and a drive assembly equipped therewith, which combine a small installation space requirement with low manufacturing costs and low installation effort.

The object is achieved by the drive unit described herein and in the claims. Advantageous embodiments of the drive unit and the drive assembly are described herein and in the claims.

The features described in the disclosure and in the claims may be combined in any technically useful way, including the explanations given in the following description and features of the figures which comprise additional embodiments of the disclosure.

The terms "axial" and "radial" always refer to the axis of rotation of the electric drive unit.

The disclosure relates to a drive unit for a powertrain of an electrically driveable motor vehicle, in particular a hybrid motor vehicle, comprising a first electrical machine, a second electrical machine, and an output shaft, which is also referred to as a transmission input shaft, wherein a rotor of the second electrical machine is connected to the output shaft for conjoint rotation. Furthermore, the drive unit has a disconnect clutch with which a rotor of the first electrical machine and thus an internal combustion engine connected to a first shaft connected to the rotor of the first electrical machine for conjoint rotation is connectable or connected to the output shaft for torque transmission. According to the embodiments, it is provided that the rotor of one of the electrical machines is at least indirectly supported radially on the rotor of the other electrical machine by means of at least one rotary bearing.

In particular, it is provided that the two electrical machines are arranged in series. In an embodiment, it is provided that the rotors of the two electrical machines or their axes of rotation are arranged coaxially.

The disconnect clutch is a switchable clutch that can be switched from an open state to a closed state and vice versa.

The radial inner side of the disconnect clutch can thus be connected to the first shaft on the first electrical machine for conjoint rotation, and the radial outer side of the disconnect clutch can be connected to the output shaft, which is connected to the rotor of the second electrical machine for conjoint rotation.

Furthermore, the drive unit can have a transmission which is in operative connection with the output shaft of the drive unit, also referred to as the transmission input shaft, so that a torque provided by the output shaft or the rotary motion realized by the output shaft can be transmitted via the transmission to another transmission unit of a motor vehicle in a higher or lower ratio, or can be transmitted directly to the drive wheels of a motor vehicle.

This transmission can comprise a differential transmission or be designed as such.

According to an advantageous embodiment, the rotor of the supporting electrical machine is supported on a housing wall via its rotor support, wherein the rotor of the supported electrical machine is supported radially on the respective other rotor support.

According to a further embodiment, the rotor of the supporting electrical machine is the rotor of the second electrical machine, so that the second electrical machine is supported on the housing wall via its rotor support at two axially opposite ends. The rotor of the first electrical machine is at least indirectly supported radially via its rotor support on the rotor support of the second electrical machine.

It can be provided that an inner housing wall is arranged between the two electrical machines, wherein the disconnect clutch is arranged in the axial direction between the first electrical machine and the inner housing wall.

Thus, only one disconnect clutch and an inner housing wall are located between the two electrical machines in the axial direction, wherein only one rotary bearing for the rotor of the second electrical machine is arranged on the inner housing wall.

Furthermore, in an advantageous embodiment, the rotor support of the first electrical machine is a first shaft to which the rotor of the first electrical machine is connected for conjoint rotation.

In embodiments, the output shaft is a hollow shaft, wherein the first shaft is arranged in sections radially inside the output shaft.

Accordingly, it is provided that the output shaft assigned to the second electrical machine is supported by two rotary bearings in the housing of the drive unit, wherein the two rotary bearings assigned to the output shaft are arranged in axially opposite end regions of the output shaft.

The first shaft assigned to the first electrical machine is also supported with a first rotary bearing on the housing of the drive unit, and the first shaft is supported radially on the output shaft at the axially opposite end region.

In particular, it is provided that the support is carried out by means of rotary bearings on the housing on the side of the first electrical machine axially facing away from the second electrical machine, and that the support by means of rotary bearings on the output shaft is carried out on the side of the second electrical machine axially facing away from the first electrical machine.

Furthermore, an embodiment according to the disclosure provides that the first shaft is a hollow shaft. It can be provided here that the radial interior of the first shaft, which is created as a hollow shaft, is designed to guide coolant.

According to a further embodiment, the first shaft is supported radially on the radial inner side of the output shaft by a rotary bearing, which is designed in particular as a needle bearing. As a result, radial installation space can be saved compared to conventional embodiments.

In one embodiment of the drive unit according to the disclosure, the first shaft is designed in one piece.

This means that, in contrast to conventional embodiments in which the first shaft is formed from an input shaft and a hub arranged thereon, in the present embodiment according to the disclosure, the first shaft is a component which may have several machine elements, such as bearings, gears or also torque transmission devices, for example. Accordingly, the number of components can be reduced compared to the prior art.

For the rotationally fixed connection of the disconnect clutch to the first shaft, it is advantageously provided that the first shaft forms a shoulder which forms the radial inner side of the disconnect clutch or an input element of the disconnect clutch or is connected thereto for conjoint rotation. An input element of the disconnect clutch is thus connected for conjoint rotation to the rotor of the first electrical machine.

According to a further embodiment, the first shaft has at least one axial section that is radially covered by the rotor of the first electrical machine, at least one flow channel for discharging coolant from the radial interior of the first shaft to the first electrical machine.

In a further advantageous embodiment, it is provided that the hollow first shaft has an outer diameter $D_a$ that is in the following ratio in relation to its inner diameter $D_i$: $D_a/D_i = 3 \ldots 5$.

This means that the inner diameter $D_i$ of the hollow first shaft with respect to its outer diameter $D_a$ is dimensioned relatively large, so that a coolant transport can take place in a simple and reliable and energy-efficient manner through the interior of the first shaft. Furthermore, the relatively large diameter or the large width of the interior of the first shaft can be used during the assembly of the first shaft in order to receive a mounting mandrel therein in order to move or position the first shaft with its help, so that as a whole the assembly effort is significantly reduced and assembly can be simplified.

In addition, according to the disclosure, a drive assembly is provided, having a drive unit and an internal combustion engine, wherein the internal combustion engine is coupled for conjoint rotation or couplable to the rotor of the first electrical machine.

Such a drive assembly is advantageously configured such that, between the internal combustion engine and the first shaft, which is connected to the rotor of the first electrical machine for conjoint rotation, a first transmission stage is arranged for the purpose of converting the speed of the rotary movement realized by the internal combustion engine on the first shaft.

The output element of the internal combustion engine can be a damper unit, or a clutch for opening and closing the torque transmission path between the internal combustion engine and the drive unit, or a combination of a damper unit and a clutch.

Furthermore, the output element can have an internally toothed gearwheel as a component, which meshes with an external toothing of the first shaft and thus realizes the first transmission stage.

In a further embodiment, the drive assembly also comprises at least one wheel drive shaft, which is connected to the output shaft of the drive unit via the transmission, so that a rotary motion realized by the output shaft can be transmitted to the wheel drive shaft by the transmission.

BRIEF DESCRIPTION OF THE DRAWINGS

The disclosure described above is explained in detail below based on the relevant technical background with reference to the associated drawings, which show preferred embodiments. The disclosure is in no way restricted by the purely schematic drawings, although it should be noted that the embodiments shown in the drawings are not limited to the dimensions shown. In the drawings.

DETAILED DESCRIPTION

Figure 1:
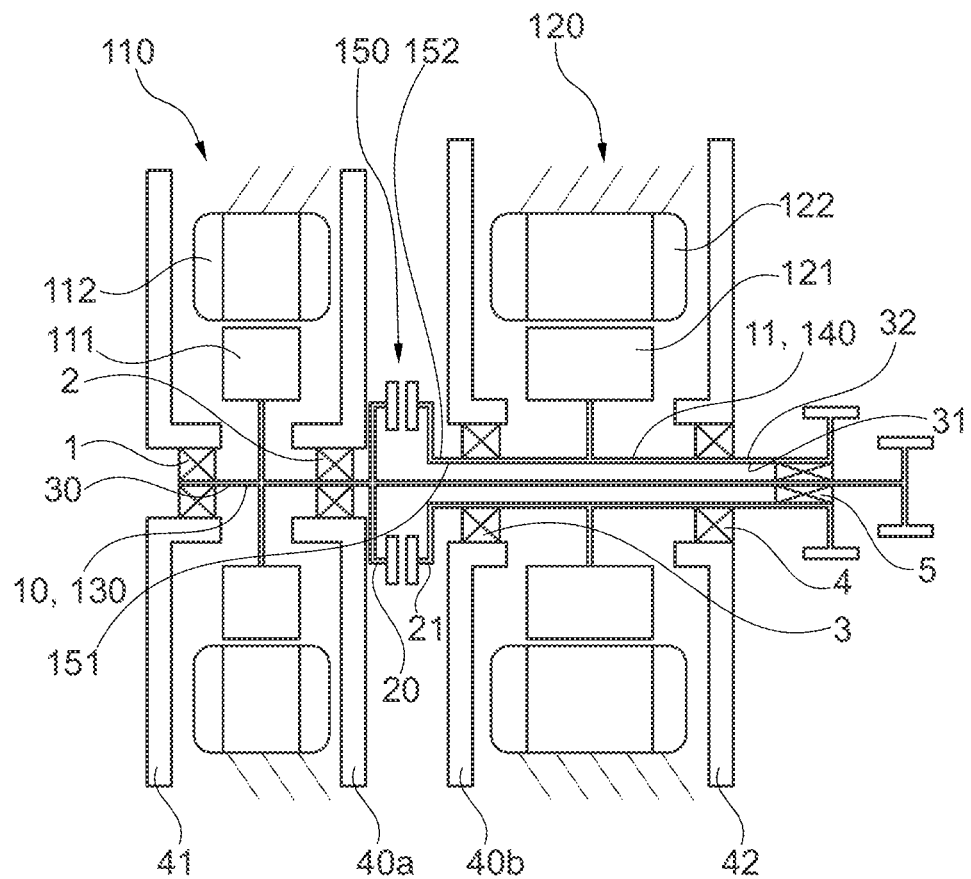
FIG. 1: shows a schematic representation of a drive unit according to the prior art.

FIG. 1 has already been discussed in detail to explain the prior art.

Figure 2:
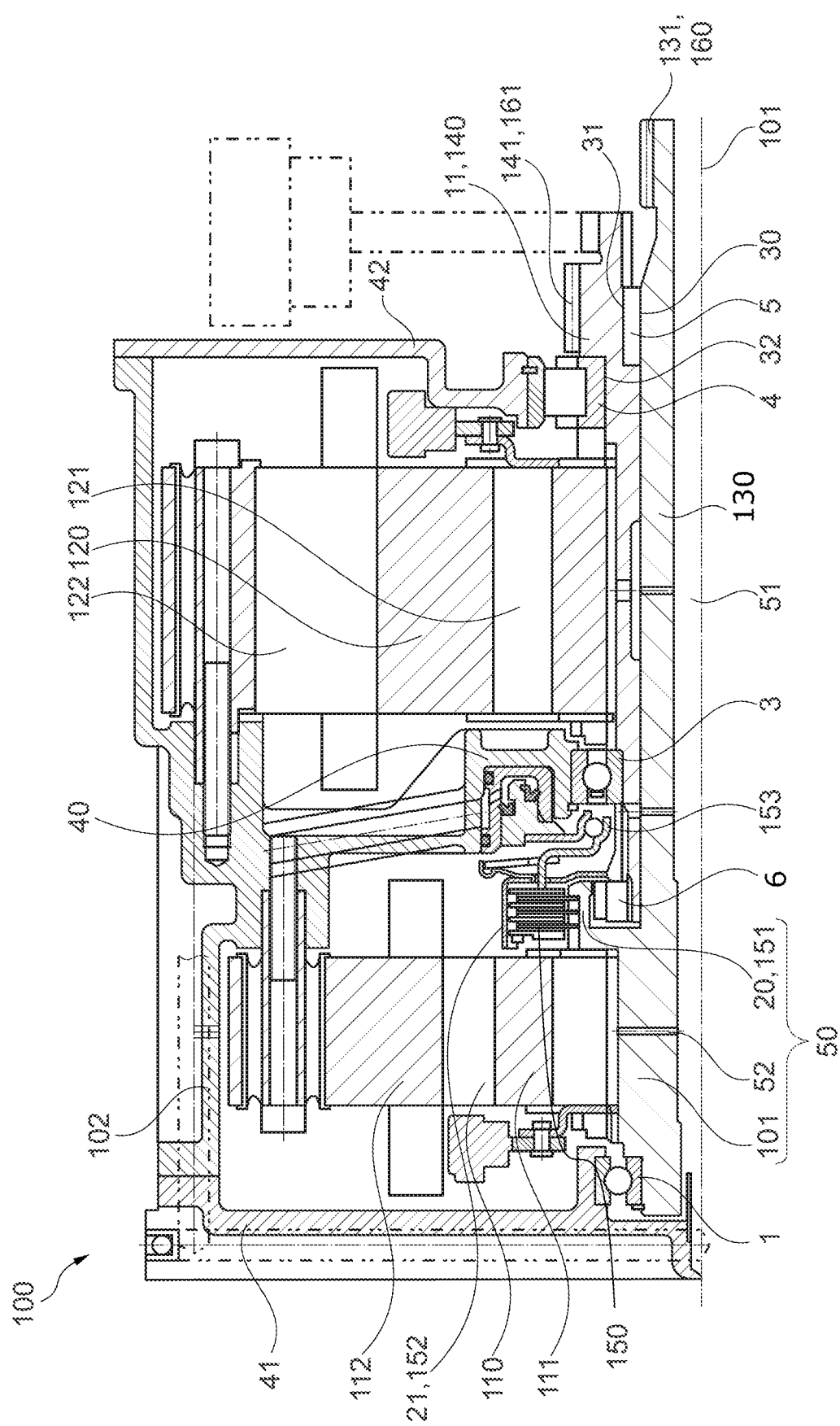
FIG. 2: shows a partial region of a drive unit according to embodiments of the disclosure in sectional view.

FIG. 2 shows a section of a drive unit 100 according to the disclosure for a powertrain of an electrically driveable motor vehicle, in particular a hybrid motor vehicle, which has a first electrical machine 110 and a second electrical machine 120, both of which are arranged on a common axis of rotation 101. The rotor 111 of the first electrical machine 110 is arranged coaxially to the axis of rotation 101 and also to the rotor 121 of the second electrical machine 120. The spaces in which the two electrical machines 110, 120 are arranged are each delimited on both sides in the axial direction by a housing wall 40, 41, 42. Each electrical machine 110, 120 is assigned bearings 1, 3, 4, 5 axially arranged on both sides.

The stator 112 of the first electrical machine 110 and also the stator 122 of the second electrical machine 120 are accommodated in a housing 102 of the drive unit 100.

The rotor 111 of the first electrical machine 110 is connected to a first shaft 130 for conjoint rotation.

The rotor 121 of the second electrical machine 120 is connected to an output shaft 140 for conjoint rotation, which can also be referred to as a transmission input shaft.

The first electrical machine 110 is mounted on the outer housing wall 41 by means of the first rotary bearing 1 of the first electrical machine 110. The second electrical machine 120 is supported on the inner housing wall 40 of the housing 102 by a first rotary bearing 3 of the second electrical machine 120 and on the outer housing wall 42 by a second rotary bearing 4 of the second electrical machine 120.

Furthermore, the first shaft 130 is supported radially on the radial inner side 31 of the output shaft 140 by a rotary bearing 5. In contrast to the other rotary bearings 1, 3, 4, the rotary bearing 5 is designed here as a needle bearing and thus requires less radial installation space than the other rotary bearings 1, 3, 4.

The drive unit 100 further comprises a disconnect clutch 150, with which the first electrical machine 110 and thus an internal combustion engine connected to the first shaft 130 rotationally fixed to the rotor 111 of the first electrical machine 110 is connectable or connected to the output shaft 140 for torque transmission. Here, the disconnect clutch 150 is arranged in the axial direction between the first electrical machine 110 and the inner housing wall 40. To secure the axial positions of the disconnect clutch 150 in relation to the output shaft 140, an axial securing element 6 is used here, which is a securing nut shown here in the embodiment, but could also be a securing ring.

In the section of the drive unit 100 shown here, the first shaft 130 is designed in one piece, wherein first shaft 130 is firmly connected to the rotor 111 of the first electrical machine 110.

The first shaft 130 forms the radial inner side 151 of the disconnect clutch 150 or an input element 20 of the disconnect clutch 150, or is firmly connected to this input side of the disconnect clutch 150.

The radial outer side 152 of the disconnect clutch 150, which realizes the output side of the disconnect clutch 150 or an output element 21 of the disconnect clutch 150, is connected for conjoint rotation to the output shaft 140.

The disconnect clutch 150 is a switchable clutch that can be switched from an open state to a closed state and vice versa. For this purpose, the disconnect clutch 150 is assigned an actuation system 153.

In this way, when the disconnect clutch 150 is closed, a torque can be transmitted from the first shaft 130 to the output shaft 140 or vice versa.

In the embodiment shown here, it is thus provided that the two electrical machines 110, 120 are arranged in series, wherein the rotors 111, 121 of the two electrical machines 110, 120 or their axes of rotation are arranged coaxially.

The first shaft 130 is arranged radially inside the output shaft 140, which is configured as a hollow shaft, whereby the overall volume required for the drive unit 100 can be made small.

Furthermore, the first shaft 130 is also designed as a hollow shaft so that it forms a radial interior 51.

An axial section 50 of the first shaft 130, which is radially overlaid by the rotor 111 of the first electrical machine 110, comprises a flow channel 52 which is designed to guide, e.g., cooling fluid from the radial interior 51 of the first shaft 130 to the first electrical machine 110. For this purpose, the flow channel 52 extends in this axial section 50 essentially in the radial direction perpendicular to the axis of rotation 101. In this case, the radial interior space 51 has an appropriate radial extent for the conduction of a sufficient amount of coolant for cooling the first electrical machine 110. Additional holes for supplying the disconnect clutch and/or the second electrical machine with fluid can also be provided. The section of the drive unit 100 shown here can further preferably comprise a transmission (not shown here), which is in operative connection with the output shaft 140 of the drive unit 100, also called transmission input shaft, so that a torque provided by the output shaft 140 or the rotary movement realized by the output shaft 140 can be transmitted via the transmission to another transmission unit of a motor vehicle in a higher or lower ratio, or can be transmitted directly to the drive wheels of a motor vehicle.

The section of a drive unit 100 according to the disclosure shown here can be part of a drive assembly (not shown).

Such a drive assembly is advantageously designed such that, between the internal combustion engine and a first shaft 130 which is connected to the rotor 111 of the first electrical machine 110 for conjoint rotation, a first transmission stage 160 for the purpose of converting the speed of the rotary movement is formed by the internal combustion engine on the first shaft 130.

The first transmission stage 160 is implemented on an external toothing 131 of the first shaft 130.

In this way, a rotary movement generated by the internal combustion engine can be directed via the first transmission stage 160 on the first shaft 130 so that the rotor 111 of the first electrical machine 110 located thereon can be set in rotary movement in order to operate as a generator.

When the disconnect clutch 150 closes, the applied rotary movement can be transmitted from the first shaft 130, possibly amplified by an electric motor drive through the first electrical machine 110, to the output shaft 140. Due to the conjointly rotating connection of the rotor 121 of the second electrical machine 120 to the output shaft 140, a torque provided by the second electrical machine 120 can also be applied to the output shaft 140.

Alternatively, when the disconnect clutch 150 is opened, only the second electrical machine 120 can be operated alone in order to rotate the output shaft 140.

The rotary movement of the output shaft 140 is directed to the transmission via an external toothing 141 of the output shaft 140, wherein the second transmission stage 161 is realized.

If the represented drive unit 100 according to the disclosure is integrated into a drive assembly, a wide variety of driving conditions can be realized, such as, for example, operation of the internal combustion engine alone to drive a motor vehicle, or also with the addition of the second electrical machine 120 and/or the first electrical machine 110, as well as simultaneous generator operation of the first electrical machine 110 during operation of the internal combustion engine and/or the second electrical machine 120, as well as sole operation of the second electrical machine 120, or also recuperation operation of the first electrical machine 110 and/or the second electrical machine 120.

With the drive unit proposed here, a device is provided which combines a small installation space requirement with low manufacturing costs and low installation effort.

LIST OF REFERENCE NUMBERS

1 First rotary bearing of the first electrical machine
2 Second rotary bearing of the first electrical machine 3 First rotary bearing of the second electrical machine
4 Second rotary bearing of the second electrical machine
5 Rotary bearing of the output shaft
6 Axial securing element
10 Rotor support of the first electrical machine
11 Rotor support of the second electrical machine
20 Input element of the disconnect clutch
21 Output element of the disconnect clutch
30 Radial outer side of the first shaft
31 Radial inner side of the output shaft
32 Radial outer side of the output shaft
40 Inner housing wall
40a Inner housing wall on the first electrical machine
40b Inner housing wall on the second electrical machine
41 Outer housing wall on the first electrical machine
42 Outer housing wall on the second electrical machine
50 Axial section of the first shaft
51 Radial interior of the first shaft
52 Flow channel
100 Drive unit
101 Axis of rotation
102 Housing of the drive unit
110 First electrical machine
111 Rotor of the first electrical machine
112 Stator of the first electrical machine
120 Second electrical machine
121 Rotor of the second electrical machine
122 Stator of the second electrical machine
130 First shaft
131 External toothing of the first shaft
140 Output shaft
141 External toothing of the output shaft
150 Disconnect clutch
151 Radial inner side of the disconnect clutch
152 Radial outer side of the disconnect clutch
153 Actuation system
160 First transmission stage
161 Second transmission stage

The invention claimed is:

1. A drive unit for a powertrain of an electrically driveable motor vehicle, comprising:
a first electrical machine;
a second electrical machine;
an output shaft, wherein a rotor of the second electrical machine is connected to the output shaft for conjoint rotation; and
a disconnect clutch, by which a rotor of the first electrical machine for torque transmission is connectable to the output shaft, wherein a first shaft connected to the rotor of the first electrical machine is supported at one end on a housing wall by a first bearing and supported at an axially opposite end on the output shaft by a second bearing.

2. The drive unit according to claim 1, wherein the output shaft is a hollow shaft, wherein the first shaft is arranged at least in sections radially inside the output shaft.

3. The drive unit according to claim 2, wherein the first shaft is a hollow shaft.

4. The drive unit according to claim 1, wherein the first shaft is supported radially on a radial inner side of the output shaft by the second bearing.

5. The drive unit according to claim 1, wherein the first shaft is designed in one piece.

6. The drive unit according to claim 1, wherein the first shaft has at least one flow channel at least in an axial section, which is radially covered by the rotor of the first electrical machine, configured to discharge coolant from a radial interior of the first shaft to the first electrical machine.

7. A drive assembly with a drive unit according to claim 1 and with an internal combustion engine which is coupleable to the rotor of the first electrical machine for conjoint rotation.

8. A drive unit for a vehicle powertrain, comprising:
a housing having a first radial wall, a second radial wall, and a third radial wall;
a first electrical machine mounted on the first radial wall by a first bearing and including a first rotor non-rotatably connected to a first shaft, wherein the first electrical machine is arranged axially between the first radial wall and the second radial wall;
a second electrical machine supported on the second radial wall and including a second rotor non-rotatably connected to an output shaft, wherein the second electrical machine is arranged axially between the second and third radial walls; and
a disconnect clutch arranged in an axial direction between the first electrical machine and the second radial wall of the housing, the disconnect clutch being configured to selectively transfer torque between the first shaft and the output shaft,
wherein the first shaft is supported radially on a radial inner side of the output shaft by a second bearing.

9. The drive unit of claim 8, wherein the first shaft forms a radial inner side of the disconnect clutch.

10. The drive unit of claim 9, wherein the output shaft is connected to a radial outer side of the disconnect clutch.

11. The drive unit of claim 8, wherein the second bearing is a needle bearing.

12. The drive unit of claim 8, wherein the second electrical machine is supported on the second radial wall by a third bearing and supported on the third radial wall by a fourth bearing.

13. The drive unit of claim 8, wherein the first shaft includes an axial section radially overlaid by the first rotor defining a flow channel extending axially therethrough and arranged to route cooling fluid from a radial interior of the first shaft to the first electrical machine.

* * * * *